Nov. 28, 1967   C. J. KATZEW ET AL   3,354,603
METHOD OF MANUFACTURING A PLASTIC CONTAINER
Filed Aug. 3, 1964
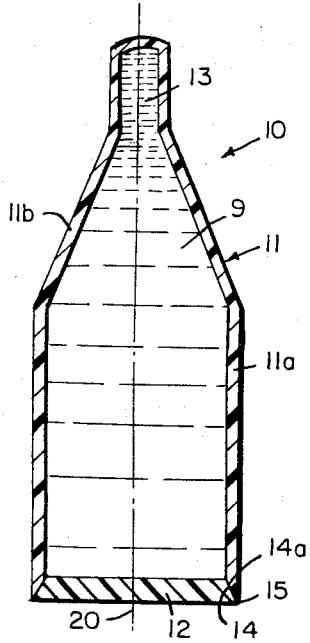
FIG. 1
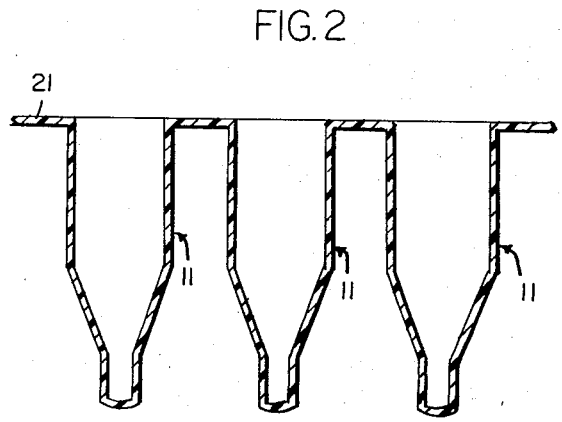
FIG. 2
FIG. 3
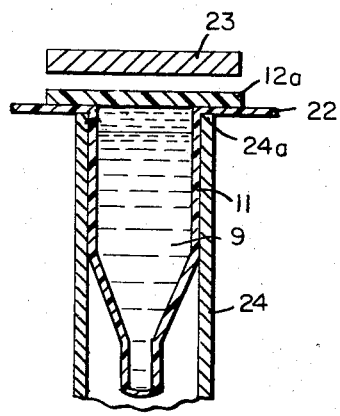
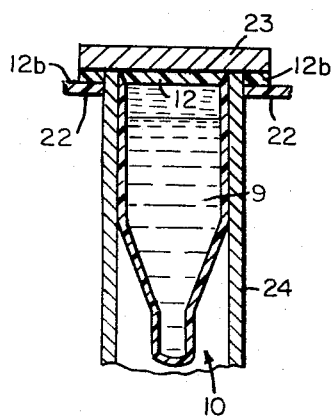
FIG. 4
INVENTORS:
CHARLES J. KATZEW
EUGENE F. FROST
BY,
Wolf, Greenfield & Hieken
ATTORNEYS

United States Patent Office 3,354,603
Patented Nov. 28, 1967

3,354,603
METHOD OF MANUFACTURING A PLASTIC CONTAINER
Charles J. Katzew, Brockton, and Eugene F. Frost, Whitman, Mass., assignors, by direct and mesne assignments, to Brockton Contract Packaging Sales Corporation, Brockton, Mass., a corporation of Massachusetts
Filed Aug. 3, 1964, Ser. No. 386,918
5 Claims. (Cl. 53—30)

The present invention relates to plastic containers and more particularly to novel thermoplastic bottles formed by an improved mass production method.

Plastic bottles are well known in the packaging industry and are coming into evermore increasing use as production technology improves. In most cases, known plastic bottles are formed by blow molding techniques, which have certain practical inherent limitations. For example, the equipment used to blow mold bottles is normally limited in practical production rates. Common blow molding methods do not allow for liquid filling of bottles formed during fabrication, but require subsequent filling steps and a subsequent closure applying step.

It is well known that thermoforming of articles can reslt in high production rates and relatively inexpensive manufacture as compared with blow molding. However, it has been difficult to produce bottles by sheet thermoforming which closely simulate blow molded bottles. As used in this specification and these claims the terms "sheet thermoforming" and "thermoforming," include vacuum forming, match molding, pressure molding and known procedures where shapes are formed from a flat stock sheet. Problems in simulating the appearance of blow molded bottles occur in forming a closure for a body portion fabricated by thermoforming. Normally the closure must be joined to the body portion over a flanged surface rather than at butting surfaces or edges.

Accordingly it is an important object of this invention to provide a thermoformed plastic bottle having a two-part body closely simulating the appearance of conventional integral, blow molded plastic bottles.

It is another object of this invention to provide a plastic bottle or container in accordance with the preceding object which has extremely high strength, yet, relatively low cost.

It is another object of this invention to provide a method for rapidly and efficiently producing bottles in accordance with the preceding objects.

It is still another object of this invention to provide a method in accordance with the preceding objects which permits mass production, rapid finishing, filling and sanitary sealing of bottles.

According to the invention, the thermoplastic bottle has a thermoformed, contoured, thermoplastic body section defining an outer peripheral rim which preferably lies substantially in a plane. A closure member for the contoured section has an outer peripheral rim butted and sealed to the first body section rim to enclose and define a volume within the bottle. Preferably the bottle contains a liquid and the body section is elongated, downwardly opening and has a central axis. An outer wall of the body section has a continuous outer peripheral edge which preferably defines a cross sectional area perpendicular to the axis at least as large as any other cross sectional area defined by the elongated body section perpendicular to the axis. The closure member is joined to the body section and has an outer peripheral edge heat and pressure sealed to the body section substantially along an endless line. Thus, no sealed inwardly directed or outwardly directed flanges are necessary and the resulting bottle of this invention has both the appearance and strength of conventionally formed blow molded plastic bottles.

According to the method of this invention, the body section having a first opened end is thermoformed from a sheet of thermoplastic material. The body section has an outer peripheral wall at the open end which defines a rim having an outer perimeter. The rim is homogeneous with an outwardly extending flange comprising material of the original thermoplastic sheet which has not been deformed. The outer perimeter of the body section is enclosed in a snugly fitting collar with the flange resting on an upper end of the collar. A closure member of plastic material having an outer configuration larger than the outer perimeter, or at least as great as the inside diameter of the wall rim, is then placed over the body section outer peripheral rim and backed with a heater to press it against the body section and form an outer peripheral rim in the closure member substantially equal in size and contiguous with the body section peripheral rim at a sealed butted joint. The sealed joint has a breaking strength substantially as great as any part of the body section. Preferably, the body section is inverted during the closure sealing operation and is filled prior to positioning of the closure. Thus, the body section serves as a measure for insuring adequate filling of the body. When the closure is sealed, a complete saleable bottle is formed. Preferably a plurality of body sections are formed on the single thermoplastic sheet material using conventional pressure molding methods and a plurality of closure members are used to allow for rapid production rates which may easily be at least as high as 800 bottles per minute or higher.

It is a feature of this invention that the sealing method forms a hermetic seal rendering the containers formed by this method particularly suitable for use as food and medicinal packages. Further, the method provides for simultaneous sealing and dinking or severing of the flanges formed during the sheet thermoforming step.

Other features, objects and advantages of the invention will be better understood and appreciated from the following detailed description of one embodiment thereof selected for purposes of illustration and shown in the accompanying drawings, in which:

FIG. 1 is a cross sectional view through a preferred embodiment of a bottle of this invention;

FIG. 2 is a diagrammatic side view in the method of this invention;

FIG. 3 is a diagrammatic view of a second step therein; and,

FIG. 4 is a diagrammatic view of a third step therein.

With reference now to the drawings and particularly FIG. 1 a thermoplastic bottle is indicated generally at 10 comprising a contoured thermoplastic body section 11 having an outer peripheral rim 15 lying substantially in a plane. The body section 11 has an outer wall 11a which is preferably cylindrical and is positioned about a central axis indicated diagramatically at 20. A circular, planar, closure member 12 closes the lower end of the body section 11 and has an outer peripheral rim or edge 14 which is uniformly heat bonded and contiguous with the outer wall 11a at a butted joint. The joint 14a between the closure member edge and the wall 11a edge is as strong as any portion of the body section or closure member.

Preferably the edge 15 defines a cross sectional area perpendicular to the axis 20 at least as great as any other area defined by the elongated body section perpendicular to the axis. In some cases the rim or edge 15 may be smaller in diameter than other portions of the wall 11a if an undercut mold is used during the thermoforming of the body section.

Because of the integral continuous joint 14a formed, the entire bottle 10 closely simulates the appearance of a blow molded conventional plastic bottle. It should be understood that while a funnel 11b and an upper elongated neck section 13 are shown and a specific configuration of the contoured upper body section described, many various designs may be used. For example, the wall 11a may be corrugated, ribbed, imprinted and changed in its design appearance. The upper section of the body portion section may be hemispheric, flat or otherwise shaped rather than peaked as in 13. The peaked or cap section 13 is preferred since the end of the neck section 13 can be cut off or punctured providing a mouth for withdrawing fluids from the bottle. The mouth orifice can be reclosed later as by placing a conventional cap about a portion of the neck unsevered from the bottle.

The upper section preferably has uniform wall thickness throughout. However, the upper body section can be designed using known sheet thermoforming techniques to taper in wall thickness from its lowermost portion up to the upper end of the neck 13, or vice versa. In some cases the neck portion 13 is formed with extremely thin wall thickness to permit it to be torn off by hand to provide a pouring orifice for the bottle.

The closure member 12 which acts as a bottom for the container or bottle preferably has a thickness at least as great as the thickest portion of the wall of body section 11. It is also possible to have a thickness of closure member 12 equal to or less than that of the body section.

Preferably the bottle 10 is filled with a composition which may comprise a liquid 9 such as a food flavoring, cosmetic lotion, medicinal agent or other normally bottled material.

The thermoplastic material of the bottle 10 may comprise any thermoplastic which can be fabricated by thermoforming such as polyethylene, polypropylene, polystyrene, impact polystyrene, cellulose acetate, cellulose butyrate and others. In some cases it may be desirable to have the body section 11 formed of one thermoplastic material while the closure member 12 is formed of still another thermoplastic material. For example, when the molding of body section 11 requires certain specific materials because of deep draw or other characteristics necessary, the closure member 12 may comprise less expensive material since it is not in fact shaped, but merely sealed at its edge. It should be noted at this point, that although the member 12 is referred to as being planar, this term refers to the edge or rim portion of the closure member. Thus, in some cases central or other areas of the closure member may be shaped, indented or embossed if desired for esthetic or other reasons.

Turning now to the method of this invention, the sheet 21 of thermoplastic material is molded as by vacuum forming to form a plurality of body sections 11 as best shown in FIG. 2. Body sections 11 may be molded by any of the known sheet thermoforming techniques including but not limited to match molding, vacuum forming, plug assist vacuum forming, air pressure forming, etc. Preferably the sheet thickness of the thermoplastic sheet 21 varies from 10 mils to 250 mils although this range is only limited by the ability of the forming equipment used and the end use of the container. Preferably the body section is a deep draw section to best simulate the appearance of the bottle and the draw depth normally exceeds 1½ times the widest orifice opening dimension defined by the body section edge 15.

After the sheet 21 is molded, it is preferably inverted with each body section 11 inverted with its orifice opening facing upwardly as shown in FIG. 2 and surrounded by a closely fitting circular sleeve or collar 24 having an upper edge 24a upon which rest flanges 22 which extend outwardly from the edge 15. Preferably the body sections 11 are then filled with a fluid or other material to be packaged. The fluid preferably completely fills the body section and a portion thereof may even run over the upper flange 22 to a suitable waste exit to assure complete filling. In some cases where incomplete filling or no filling is desired, lesser amounts of or no fluid will be used. In a subsequent step a disc or stock sheet closure 12a preferably having an outer configuration larger than the orifice defined by the edge 15 or at least as great as the inside diameter of the edge 15 is positioned above and resting upon flange 22 as best seen in FIG. 3. A heater 23 overlies the stock closure member 12a. Preferably the heater 23 is an electric heater having a planar lower surface which may be coated with Teflon or other suitable nonstick surfacing.

As shown in FIG. 4, the final sealing step is completed by bringing the heater 23 into pressing contact with the upper edge 24a of the collar 24, thus simultaneously severing waste stock closure material 12b, flange 22 and hermetically sealing the now formed closure member 12 to the body section 11 at the butted joint 14a. The completed bottle 10 is pushed downwardly in the collar 24 and preferably drops therethrough to a suitable collection zone, although in some cases air pressure means may be used to blow the bottle upwardly and discharge it through the upper end of the collar 24 after the heater 23 is removed.

Preferably a plurality of bottles are simultaneously formed at a plurality of stations in accordance with this invention. For example, as shown in FIG. 2 several body portions 11 are formed simultaneously in a plural cavity vacuum forming machine. Plural collars 24 are used to simultaneously position the closure stock material 12a on the plural body sections 11 and plural filling ports fill the body sections. Following this a plurality of contact heaters 23 contact, compress and heat the closure stock material of each body section to form the sealed bottles. In some cases a single sheet of closure stock material is used rather than separate discs individually covering each upwardly opening body portion 11 of a single sheet 21.

Surprisingly, even when the liquid used fills the body sections to a level equal to the uppermost plane of flanges 22, good seals are formed.

The temperature of the heater 23, pressure used and the time period for applying the temperature and pressure vary depending upon the particular size of the item being manufactured and the particular thermoplastic used. Generally the pressure forcing heater 23 towards collar rim 24a is just sufficient to sever the flange 22 and a portion 12b of the closure member at the temperature used. The temperature normally varies from approximately 100° F. to 500° F. In all cases the temperature of the heater 23 is higher than the melting temperature of the plastic of the closure stock material.

Preferably the material of the closure member 12 has a melting point substantially equal to or less than the melting point of the body portion 11a.

In a specific embodiment of this invention, polyethylene sheet stock having a thickness of 40 mils is run into an eight cavity vacuum forming machine and eight body sections 11 are formed each having an orifice defined by edge 15 of ¾ inch diameter and a depth of 2¾ inches. The resulting sheet is placed as shown in FIG. 3 over eight tubes having an inside diameter of ¾ inch and an outside diameter of 1 inch and an axial length of 3 inches. Each body section 11 is filled to the edge 15 with sterile water. 20 mil thickness polyethylene sheet stock 12a is placed over each orifice and a contact heater 23 having a Teflon coated lower surface is urged against each closure member and heated to a temperature of 300° F. for 10 to 15 seconds under 40 p.s.i. pressure. The bottles formed closely resemble conventional blow molded bottles and have sufficient strength for normal usage, shipping and storage purposes.

While a specific embodiment of this invention has been shown and described, many modifications thereof are possible. For example, as has been pointed out the specific design of the bottles may vary considerably and need not be symmetrical as shown in the specific example. Containers of any and all shapes, sizes and dimensions can be sealed by the method of this invention. The specific equipment used to carry out this method can vary as can production rates, pressures, times and temperatures. For example, instead of a flat plate iron 23 a heated ring can be used. A flat plate having a plurality of holes or collars for receiving body portion 11 can be used in place of the tubes 24, in accordance with known techniques. The bottles produced are particularly suitable for use in the food and drug industry since the contents are never handled after formation of the seals and convenient sized ampules and storage containers can be easily formed in mass production runs. While the bottles formed may be used to contain fluids, they can be formed empty or filled with powder, pellets, solids, pastes and the like if desired.

While the term "butt sealed" has been used to describe the joint, it should be understood that this term includes plug sealing. Thus the closure member acts as a plug and at least portions thereof are sealed in final positions below the uppermost edge of the body member wall 11a as best seen in FIG. 4. In fact it is preferred that the uppermost surface of the closure member lie in a plane defined by the body wall edge.

Preferably the bottles or containers formed define a closed sealed volume, however, if desired the body portions such as 11 may be opened or pierced previous to joining to the closure member. For example, in a case where the neck section 13 is vacuum formed with a thread, the end thereof may be severed and a screw cap fitted before filling and/or sealing of the closure member.

Therefore the invention is to be limited only by the spirit and scope of the appended claims.

What is claimed is:
1. A method of forming an esthetically pleasing thermoplastic container comprising,
    thermoforming a body section having one opened end from a sheet of thermoplastic material,
    said body section having an outer peripheral wall at said opened end, said wall defining a rim having an inner perimeter and an outer perimeter,
    said rim carrying a homogeneous outwardly extending flange,
    enclosing said outer perimeter within a collar with said flange placed above an upper end of said collar,
    placing a closure member having an outer configuration at least as great as said rim inner perimeter over said body section at said peripheral rim and heating said closure member while pressing it against said body section rim to form an outer peripheral rim on said closure member substantially equal in size and butt sealed to said peripheral rim while simultaneously separating said outwardly extending flange from said body section and severing an outer portion of said closure member which forces at least a part of said closure member past said body wall rim with said outer perimeter remaining substantially unchanged in dimension.
2. A method in accordance with the method of claim 1 wherein said closure member comprises the same thermoplastic material as said sheet of thermoplastic material.
3. A method of forming a plurality of thermoplastic bottles from a sheet of thermoplastic material, said method comprising,
    thermoforming a plurality of bottle body sections each having one opened end from a first sheet of thermoplastic material,
    each of said body sections having an outer peripheral wall at said open end,
    each of said walls defining a rim having an inner perimeter and an outer perimeter,
    said wall rims being joined together by flanges forming a web therebetween,
    enclosing each of said outer perimeters within a corresponding plurality of collars with flanges of said body sections resting on upper ends of said collars,
    placing a plurality of closure members over a corresponding plurality of said body section rims,
    heating said closure members while pressing them against said body section rims to form outer peripheral rims in each closure member substantially equal in size and butt sealed to said body section peripheral rims with said web being separated from said body sections and an outer portion of said closure members being severed by said heating and pressing which forces at least a part of each of said closure members past each body wall rim.
4. A method in accordance with claim 3 wherein said closure members comprise portions of a second single sheet of thermoplastic material.
5. A method in accordance with the method of claim 3 wherein said body sections are inverted and a material selected from the group consisting essentially of fluids, powders, pellets, pastes and the like is introduced into said body sections prior to said sealing.

References Cited

UNITED STATES PATENTS

| | | | |
|---|---|---|---|
| 1,387,805 | 8/1921 | Roberts | 53—372 X |
| 1,400,146 | 12/1921 | Eggers et al. | 264—248 X |
| 2,632,724 | 3/1953 | Lumbard | 53—39 X |
| 2,684,397 | 7/1954 | Gottschall | 156—69 X |
| 2,898,714 | 8/1959 | Heith | 53—30 |
| 2,958,168 | 11/1960 | Vogt | 53—30 |
| 3,107,805 | 10/1963 | Asher | 215—1 |
| 3,171,559 | 3/1965 | Ferree | 215—1 |

FOREIGN PATENTS

| | | |
|---|---|---|
| 1,035,442 | 4/1953 | France. |
| 1,269,275 | 7/1961 | France. |
| 1,330,589 | 5/1963 | France. |

TRAVIS S. McGEHEE, *Primary Examiner.*

JOSEPH R. LECLAIR, *Examiner.*

N. ABRAMS, V. A. TOMPSON, *Assistant Examiners.*